US012675469B2

(12) United States Patent (10) Patent No.: US 12,675,469 B2
Singh et al. (45) Date of Patent: Jul. 7, 2026

(54) QUERY CREATION AND EXECUTION ON DATA CONTENT

(71) Applicant: Honeywell International Inc., Charlotte, NC (US)

(72) Inventors: Ankit Singh, Apex, NC (US); Timothy Sneed, Beachwood, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/677,946

(22) Filed: May 30, 2024

(65) Prior Publication Data

US 2025/0370991 A1 Dec. 4, 2025

(51) Int. Cl.
| | |
|---|---|
| *G06F 16/00* | (2019.01) |
| *G06F 16/23* | (2019.01) |
| *G06F 16/242* | (2019.01) |
| *G06F 16/2455* | (2019.01) |

(52) U.S. Cl.
CPC ........ *G06F 16/242* (2019.01); *G06F 16/2365* (2019.01); *G06F 16/2455* (2019.01)

(58) Field of Classification Search
CPC .............................. G06F 16/00; G06F 16/242
See application file for complete search history.

(56) References Cited

U.S. PATENT DOCUMENTS

| | | | |
|---|---|---|---|
| 2018/0129746 A1* | 5/2018 | Zhu ..................... | G06F 16/2453 |
| 2021/0256079 A1* | 8/2021 | Zhu ..................... | G06F 16/2452 |

* cited by examiner

*Primary Examiner* — Cheryl Lewis

(57) ABSTRACT

Approaches for creating and executing queries on data content are described. According to one example, selection of at least two data fields may be received from a user, for creating a query. The at least two data fields may correspond to a portion of the data and may indicate different attributes or parameters for creating the query. In response to the selection, the query may be validated in real-time for notifying any error in the query.

19 Claims, 9 Drawing Sheets

SYSTEM 100

PROCESSOR(S) 102

MACHINE READABLE STORAGE MEDIUM 104

INSTRUCTIONS 106

OBTAIN DATA CONTENT COMPRISING ONE OR MORE PORTIONS, EACH OF THE ONE OR MORE PORTIONS COMPRISES AT LEAST A SET OF DATA 108

RENDER A PORTION FROM THE ONE OR MORE PORTIONS TO AN AUTHORIZED USER 110

RECEIVE A SELECTION OF AT LEAST TWO DATA FIELDS CORRESPONDING TO THE RENDERED PORTION OF THE DATA CONTENT FROM THE AUTHORIZED USER, TO CREATE A QUERY 112

COMPUTE, BASED ON PRE-DEFINED RULES, A MATCHING SCORE BETWEEN THE QUERY BEING CREATED AND A PLURALITY OF PRE-EXECUTED QUERIES 114

DETERMINE THAT THE MATCHING SCORE BETWEEN THE QUERY BEING CREATED AND A SET OF PRE-EXECUTED QUERIES FROM THE PLURALITY OF PRE-EXECUTED QUERIES IS ABOVE A PRE-DEFINED THRESHOLD SCORE 116

UPON DETERMINING, AUTOMATICALLY GENERATE A RECOMMENDATION INDICATING THE USER TO CONTINUE WITH THE QUERY CREATION OR SELECT A PRE-EXECUTED QUERY FROM THE SET OF PRE-EXECUTED QUERIES 118

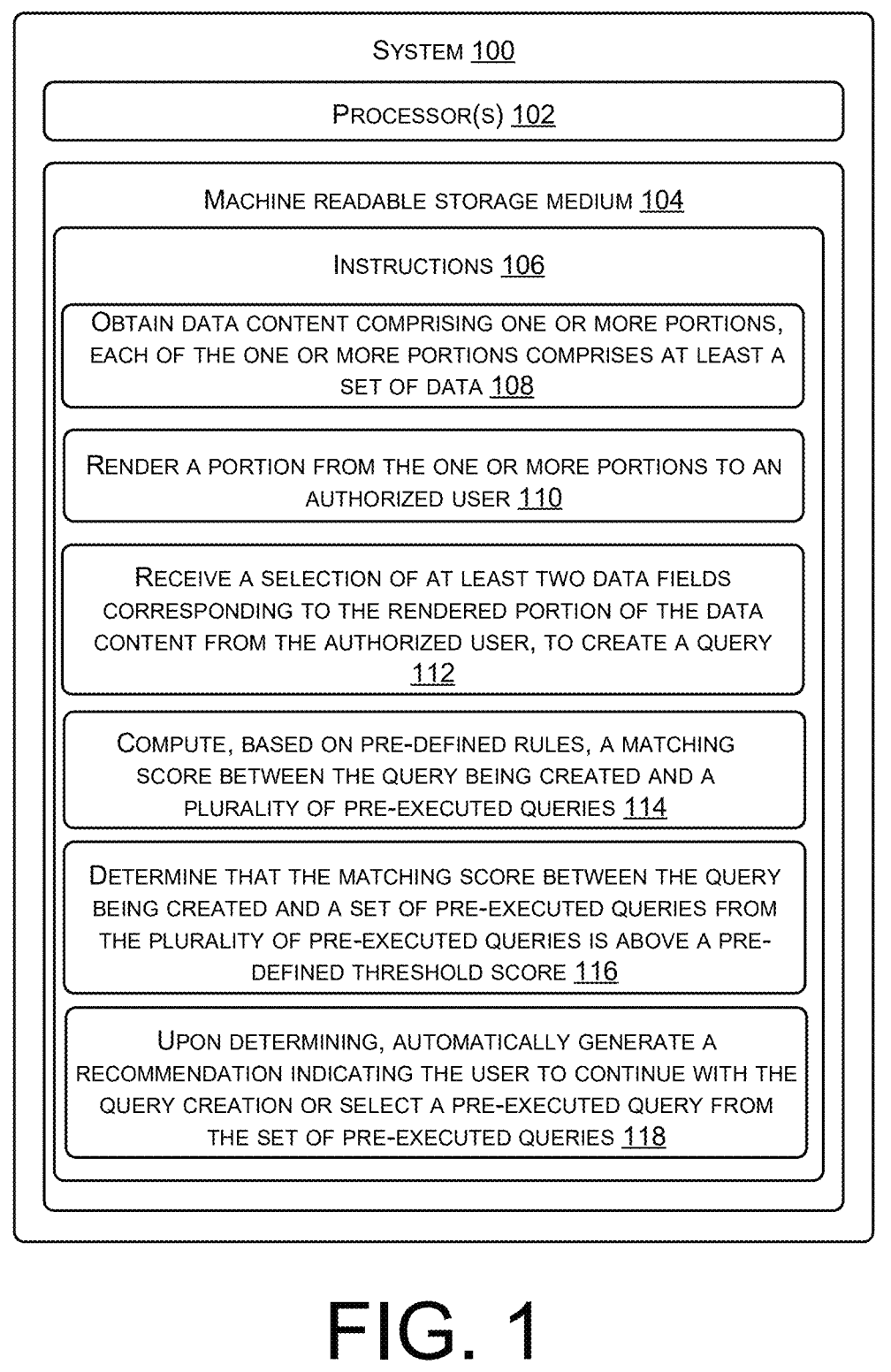

SYSTEM 100

PROCESSOR(S) 102

MACHINE READABLE STORAGE MEDIUM 104

INSTRUCTIONS 106

OBTAIN DATA CONTENT COMPRISING ONE OR MORE PORTIONS, EACH OF THE ONE OR MORE PORTIONS COMPRISES AT LEAST A SET OF DATA 108

RENDER A PORTION FROM THE ONE OR MORE PORTIONS TO AN AUTHORIZED USER 110

RECEIVE A SELECTION OF AT LEAST TWO DATA FIELDS CORRESPONDING TO THE RENDERED PORTION OF THE DATA CONTENT FROM THE AUTHORIZED USER, TO CREATE A QUERY 112

COMPUTE, BASED ON PRE-DEFINED RULES, A MATCHING SCORE BETWEEN THE QUERY BEING CREATED AND A PLURALITY OF PRE-EXECUTED QUERIES 114

DETERMINE THAT THE MATCHING SCORE BETWEEN THE QUERY BEING CREATED AND A SET OF PRE-EXECUTED QUERIES FROM THE PLURALITY OF PRE-EXECUTED QUERIES IS ABOVE A PRE-DEFINED THRESHOLD SCORE 116

UPON DETERMINING, AUTOMATICALLY GENERATE A RECOMMENDATION INDICATING THE USER TO CONTINUE WITH THE QUERY CREATION OR SELECT A PRE-EXECUTED QUERY FROM THE SET OF PRE-EXECUTED QUERIES 118

FIG. 1

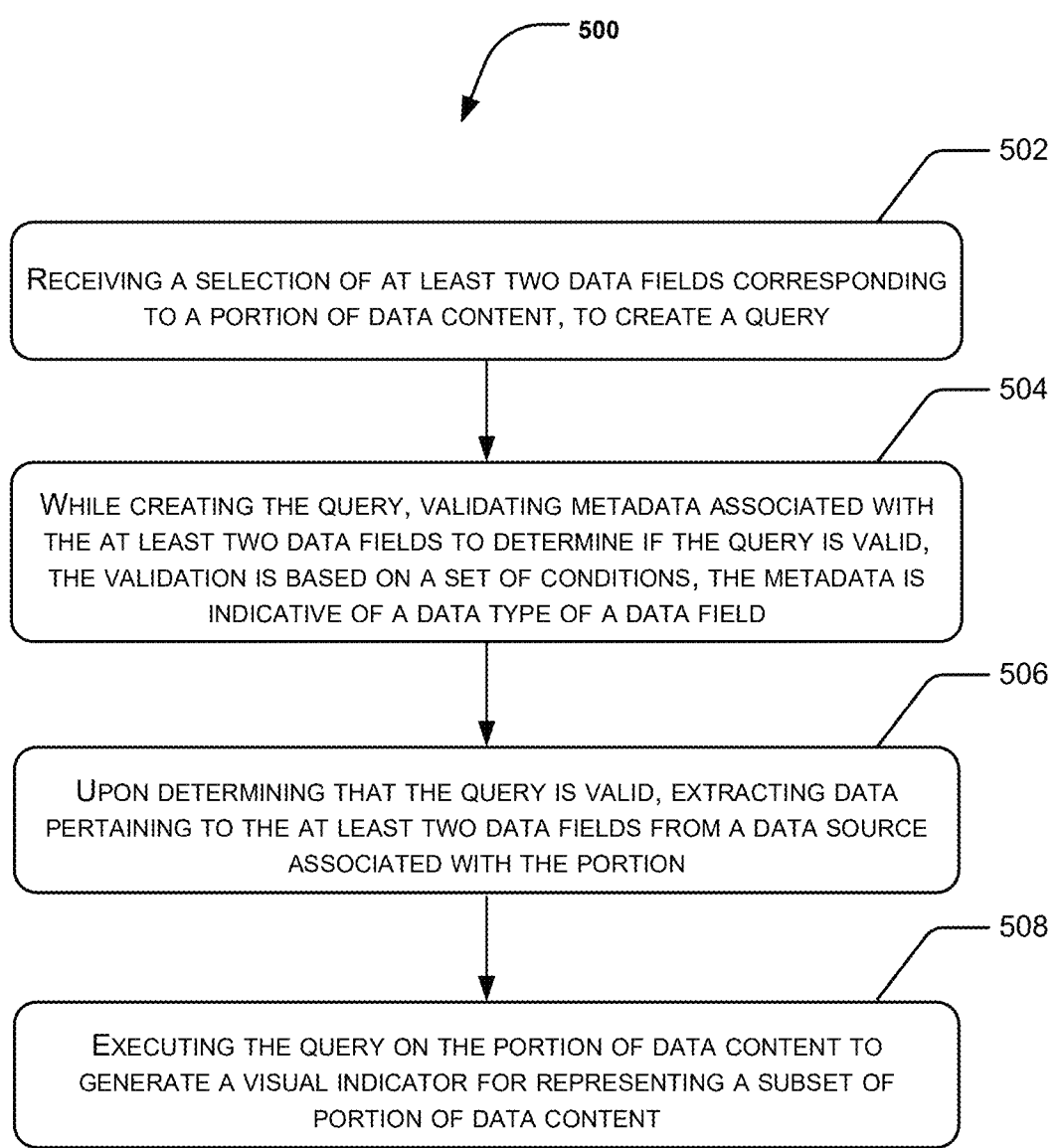

RECEIVING A SELECTION OF AT LEAST TWO DATA FIELDS CORRESPONDING TO A PORTION OF DATA CONTENT, TO CREATE A QUERY

WHILE CREATING THE QUERY, VALIDATING METADATA ASSOCIATED WITH THE AT LEAST TWO DATA FIELDS TO DETERMINE IF THE QUERY IS VALID, THE VALIDATION IS BASED ON A SET OF CONDITIONS, THE METADATA IS INDICATIVE OF A DATA TYPE OF A DATA FIELD

UPON DETERMINING THAT THE QUERY IS VALID, EXTRACTING DATA PERTAINING TO THE AT LEAST TWO DATA FIELDS FROM A DATA SOURCE ASSOCIATED WITH THE PORTION

EXECUTING THE QUERY ON THE PORTION OF DATA CONTENT TO GENERATE A VISUAL INDICATOR FOR REPRESENTING A SUBSET OF PORTION OF DATA CONTENT

DETERMINING WHETHER THE DATA BEING EXTRACTED FROM THE DATA SOURCE CORRESPONDS TO THE METADATA ASSOCIATED WITH THE DATA FIELD

604

BASED ON THE DETERMINATION, GENERATING A LIST OF VALIDATION ERRORS IN THE QUERY AND REASONS THEREOF

606

GENERATING A NOTIFICATION PROMPTING A USER TO PERFORM ONE OF A DELETION OF THE QUERY AND A MODIFICATION OF THE QUERY

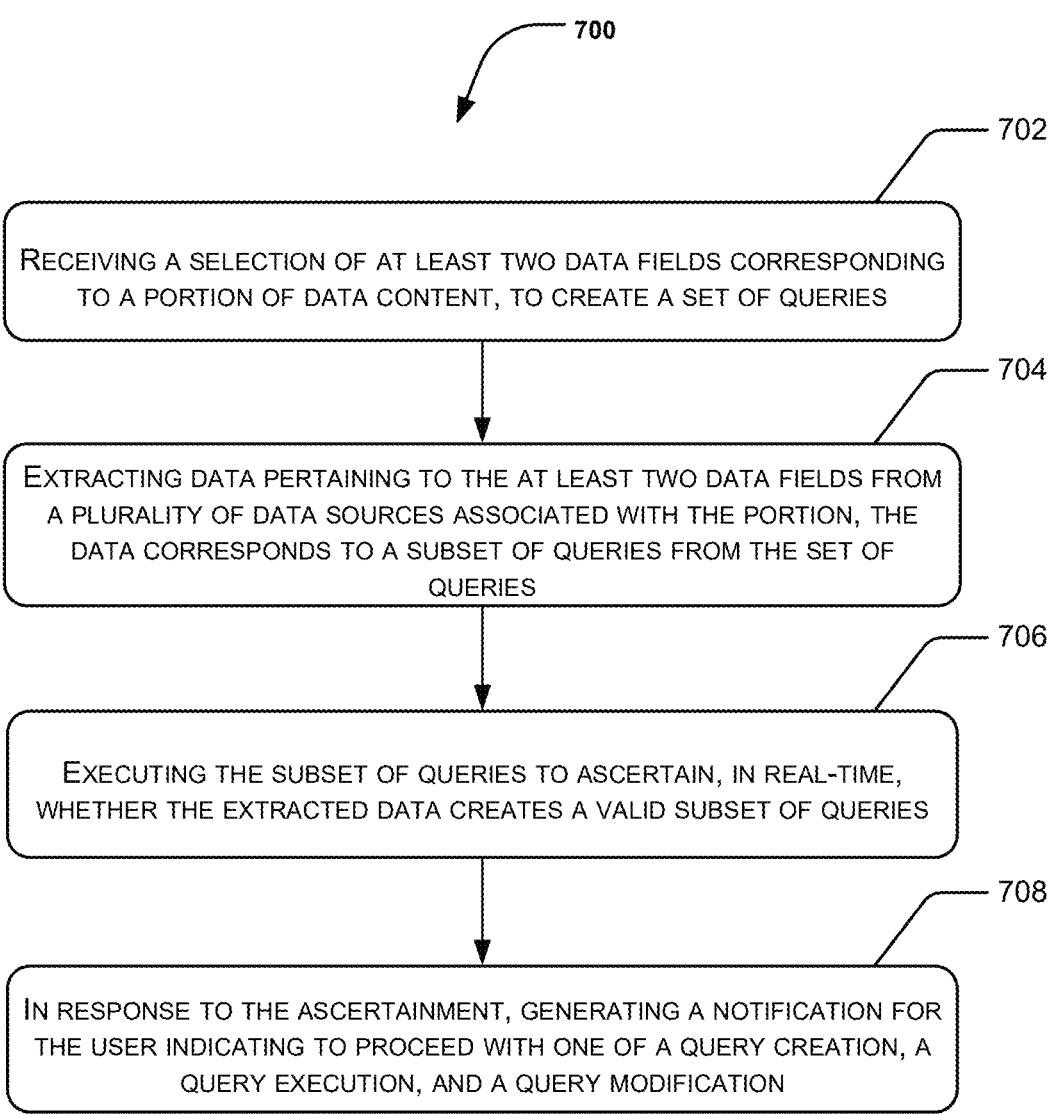

700

702

RECEIVING A SELECTION OF AT LEAST TWO DATA FIELDS CORRESPONDING TO A PORTION OF DATA CONTENT, TO CREATE A SET OF QUERIES

704

EXTRACTING DATA PERTAINING TO THE AT LEAST TWO DATA FIELDS FROM A PLURALITY OF DATA SOURCES ASSOCIATED WITH THE PORTION, THE DATA CORRESPONDS TO A SUBSET OF QUERIES FROM THE SET OF QUERIES

706

EXECUTING THE SUBSET OF QUERIES TO ASCERTAIN, IN REAL-TIME, WHETHER THE EXTRACTED DATA CREATES A VALID SUBSET OF QUERIES

708

IN RESPONSE TO THE ASCERTAINMENT, GENERATING A NOTIFICATION FOR THE USER INDICATING TO PROCEED WITH ONE OF A QUERY CREATION, A QUERY EXECUTION, AND A QUERY MODIFICATION

FIG. 7

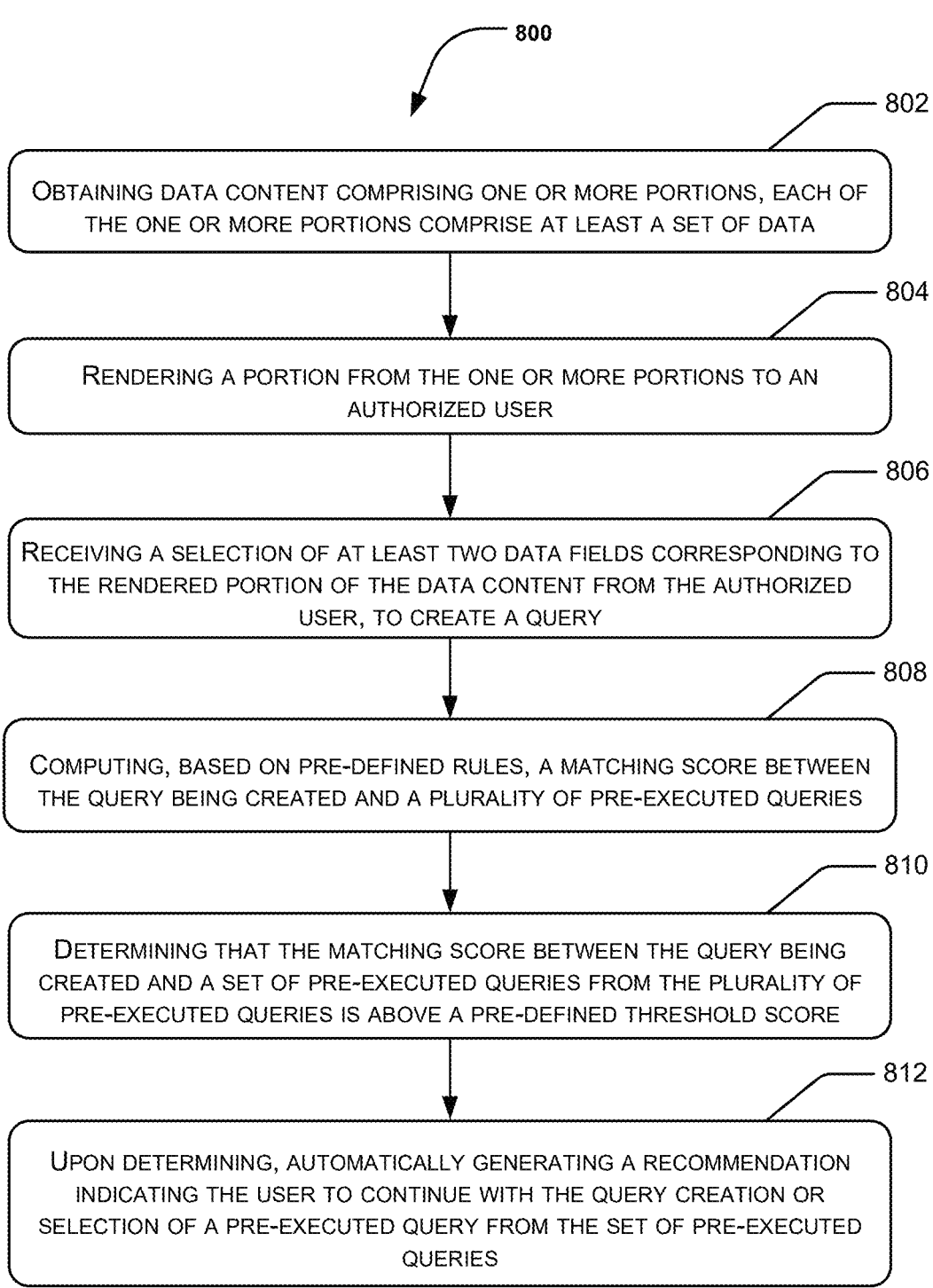

800

802
OBTAINING DATA CONTENT COMPRISING ONE OR MORE PORTIONS, EACH OF THE ONE OR MORE PORTIONS COMPRISE AT LEAST A SET OF DATA

804
RENDERING A PORTION FROM THE ONE OR MORE PORTIONS TO AN AUTHORIZED USER

806
RECEIVING A SELECTION OF AT LEAST TWO DATA FIELDS CORRESPONDING TO THE RENDERED PORTION OF THE DATA CONTENT FROM THE AUTHORIZED USER, TO CREATE A QUERY

808
COMPUTING, BASED ON PRE-DEFINED RULES, A MATCHING SCORE BETWEEN THE QUERY BEING CREATED AND A PLURALITY OF PRE-EXECUTED QUERIES

810
DETERMINING THAT THE MATCHING SCORE BETWEEN THE QUERY BEING CREATED AND A SET OF PRE-EXECUTED QUERIES FROM THE PLURALITY OF PRE-EXECUTED QUERIES IS ABOVE A PRE-DEFINED THRESHOLD SCORE

812
UPON DETERMINING, AUTOMATICALLY GENERATING A RECOMMENDATION INDICATING THE USER TO CONTINUE WITH THE QUERY CREATION OR SELECTION OF A PRE-EXECUTED QUERY FROM THE SET OF PRE-EXECUTED QUERIES

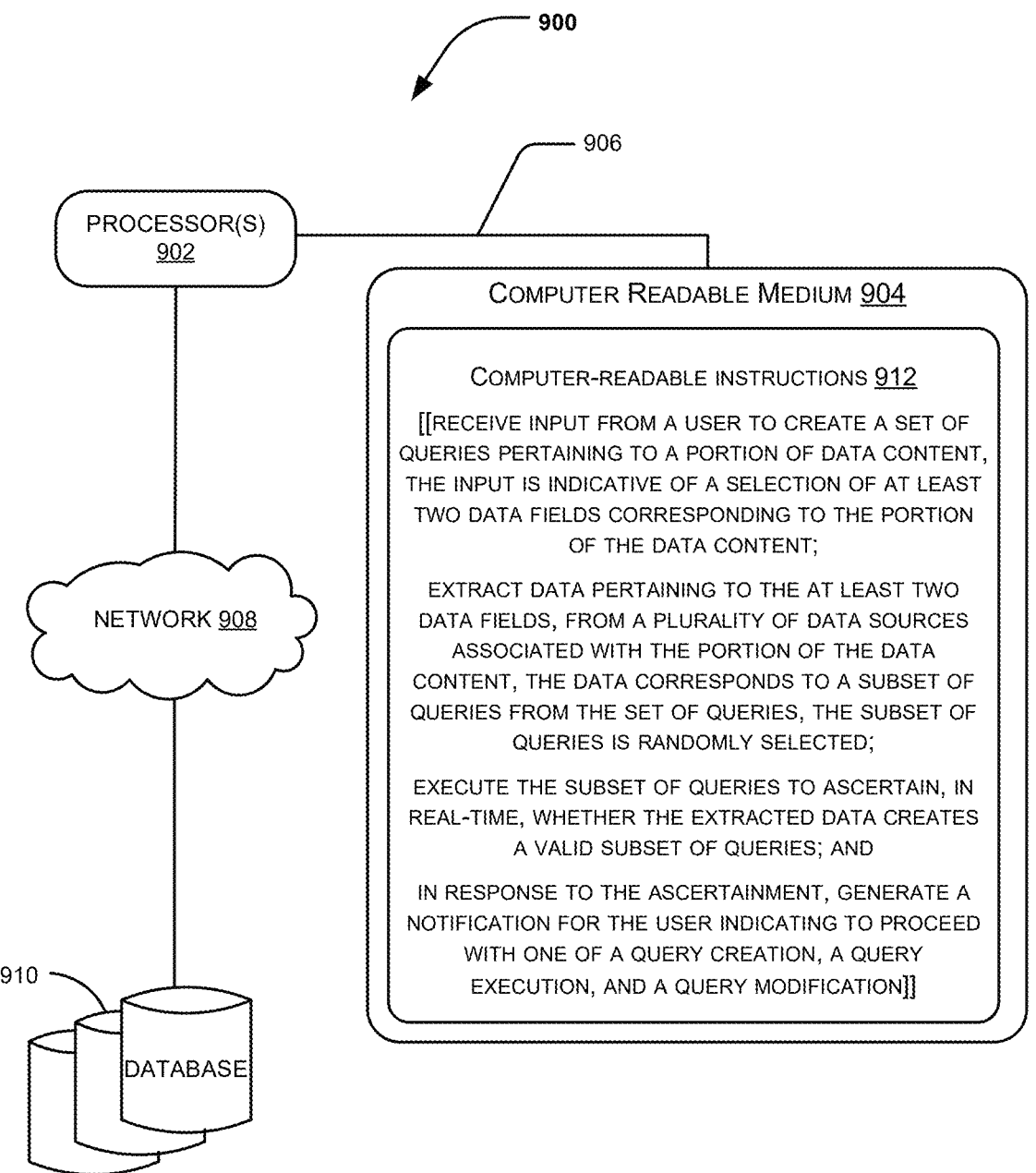

PROCESSOR(S)
902

COMPUTER READABLE MEDIUM 904

COMPUTER-READABLE INSTRUCTIONS 912

[[RECEIVE INPUT FROM A USER TO CREATE A SET OF QUERIES PERTAINING TO A PORTION OF DATA CONTENT, THE INPUT IS INDICATIVE OF A SELECTION OF AT LEAST TWO DATA FIELDS CORRESPONDING TO THE PORTION OF THE DATA CONTENT;

EXTRACT DATA PERTAINING TO THE AT LEAST TWO DATA FIELDS, FROM A PLURALITY OF DATA SOURCES ASSOCIATED WITH THE PORTION OF THE DATA CONTENT, THE DATA CORRESPONDS TO A SUBSET OF QUERIES FROM THE SET OF QUERIES, THE SUBSET OF QUERIES IS RANDOMLY SELECTED;

EXECUTE THE SUBSET OF QUERIES TO ASCERTAIN, IN REAL-TIME, WHETHER THE EXTRACTED DATA CREATES A VALID SUBSET OF QUERIES; AND

IN RESPONSE TO THE ASCERTAINMENT, GENERATE A NOTIFICATION FOR THE USER INDICATING TO PROCEED WITH ONE OF A QUERY CREATION, A QUERY EXECUTION, AND A QUERY MODIFICATION]]

NETWORK 908

910

DATABASE

FIG. 9

QUERY CREATION AND EXECUTION ON DATA CONTENT

BACKGROUND

Organizations across various industries, such as life sciences, finance, and technology, accumulate vast amounts of data content as part of various operational, research, and strategic operations associated with the organizations. The data content forms the basis for insightful report generation. For example, analytical reports may be generated based on the data content for analysis of an organization's finances. The analytical reports may also be used for analysis of performance of an organization's operations, for analysis of market trends, new products, preference of consumers, etc. The analytical reports associated with the organizations generally include multiple portions, also referred to as chapters, of the data content.

To obtain meaningful insights from each portion of the data content, one or more queries are required to be defined. The queries are usually defined at a granular level, such as a separate set of queries for each portion of the data content. The queries so defined are used to extract specific data pertaining to a subset of the portion of the data content. Based on the specific data, the queries facilitate in generating visual indicators, such as charts, graphs, tables, etc. The visual indicators enable the stakeholders to interpret various patterns, trends, and correlations within the data content.

SUMMARY OF INVENTION

This summary is provided to introduce concepts related to creating and executing queries on data content, especially related to various organizations. This summary is not intended to identify essential features of the claimed subject matter nor is it intended for use in determining or limiting the scope of the claimed subject matter.

In an aspect of the present subject matter, a method for creating a query and validating a query is disclosed. The method includes receiving a selection of at least two data fields corresponding to a portion of data content, to create a query. Further, in the method, while creating the query, metadata associated with the at least two data fields may be validated to determine if the query is valid. In an example, the validation is based on a set of conditions. Further, the metadata is indicative of a data type of a data field. The method also includes extracting data pertaining to the at least two data fields from a data source associated with the portion, upon determining that the query is valid. In addition, as per the method, the query may be executed on the portion of data content to generate a visual indicator for representing a subset of the portion of data content.

In another aspect of the present subject matter, a system for creating a query and matching the query are disclosed. The system includes a processor and a machine-readable storage medium comprising instructions executable by the processor. The instructions when executed cause the processor to obtain data content comprising one or more portions. Each of the one or more portions comprises at least a set of data. Further, the instructions when executed cause the processor to render a portion from the one or more portions to an authorized user. The instructions when executed also cause the processor to receive a selection of at least two data fields corresponding to the rendered portion of the data content from the authorized user, to create a query. In addition, the instructions cause the processor to compute a matching score between the query being created and a plurality of pre-executed queries. The matching score may be computed based on pre-defined rules. The instructions also cause the processor to determine that the matching score between the query being created and a set of pre-executed queries from the plurality of pre-executed queries is above a pre-defined threshold score. Upon determining, the instructions cause the processor to, automatically generate a recommendation indicating the user to continue with the query creation or select a pre-executed query from the set of pre-executed queries.

In yet another aspect of the present subject matter, a non-transitory computer readable medium for creating and validating a query is disclosed. The non-transitory computer readable medium has instructions stored thereon. The instructions, when executed by a processor, cause the processor to perform operations. In the operations, an input from a user is received to create a set of queries pertaining to a portion of data content. The input is indicative of a selection of at least two data fields corresponding to the portion. Further, data pertaining to the at least two data fields may be extracted from a plurality of data sources associated with the portion. The data corresponds to a subset of queries from the set of queries. The subset of queries may be randomly selected. In addition, the subset of queries may be executed in real-time to ascertain whether the extracted data creates a valid subset of queries. In response to the ascertainment, a notification may be generated for the user indicating to proceed with one of a query creation, a query execution, and a query modification.

BRIEF DESCRIPTION OF FIGURES

Systems and/or methods are now described, in accordance with examples of the present subject matter and with reference to the accompanying figures, in which:

FIG. 1 illustrates a system for creating and executing a query on data content, according to an example;

FIG. 5 illustrates a method for creating and executing a query on data content, according to an example;

FIG. 7 illustrates a method for real-time validation of a query based on data retrieved from a plurality of data sources, according to another example;

FIG. 8 illustrates a method for pattern matching while creation of queries on portion of data content, according to another example; and FIG. 9 illustrates a computing environment implementing a non-transitory computer-readable medium for creating and executing a query on data content, according to an example.

DETAILED DESCRIPTION

Figure 2:
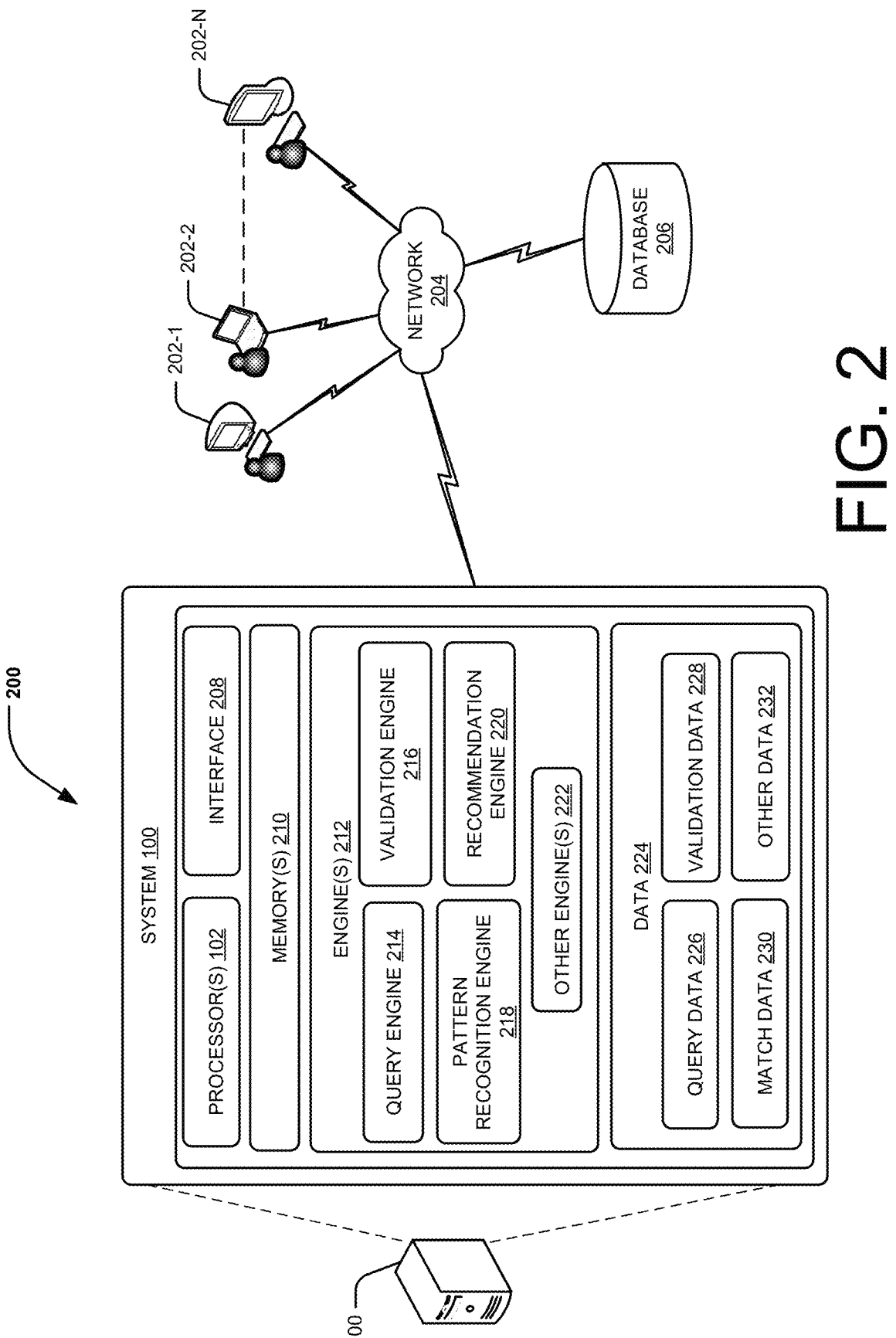
FIG. 2 illustrates a communication environment implementing a system for creating and executing a query on data content, according to another example.

Data content in the context of organizations may relate to all the information pertaining to an organization, such as sales data, customer data, research and development data, and so on. The data content may be presented in the form of various analytical reports, such as audit reports, product sales reports and so on, to allow stakeholders to extract actionable insights from the data content. Typically, the data content may include multiple portions depicting different sections or parts of the data content. For example, an analytical report may include multiple chapters, such as chapters depicting an organization's sales data in different regions, chapters depicting sales data for different products of the organization, and chapters focusing on sales and revenue of different departments of the organization.

To represent the data content in a concise manner, one or more visual indicators are employed. For example, in case of analytical reports one or more visual indicators are generally incorporated to graphically represent subset of the data content relevant to the purpose of the analytical reports. Examples of a visual indicator may include, but are not limited to, a chart, a graph, a heatmap, a dashboard, etc. For example, if the analytical report is a product sales report, the analytical report may include multiple graphs and charts representing sales data of a product of an enterprise. To generate the visual indicators for each portion or chapter of the analytical report, multiple queries are defined by users using different business intelligence (BI) tools. A query may include a row of multiple data fields, such as a data source, an object, a column, and so on. The data source may refer to various databases that may be associated with the data content and from which the data is extracted. The object may refer to specific tables within these data sources that are queried. The columns may be understood as individual data points within these objects that are selected for extraction.

Typically, queries are defined or created at a portion level. That means that each query is tailored to serve data retrieval and analysis requirements of a specific portion within the data content. As a result, the queries are bound to their respective portions, lacking flexibility to be utilized beyond the specific portion of the data content. The portion specific query generation therefore necessitates creation of a distinct set of queries for each portion, even when the underlying query requirements are similar to those in other portions. This results in a redundancy of effort, as the same or similar queries needs to be recreated for each portion. Therefore, defining portion-specific queries presents a bottleneck in generation of visual indicators, thereby limiting the scalability and efficiency of data management and analytics.

In addition, generally multiple queries, for instance in the order of thousands, are created by the users to generate visual indicators for the specific portions of the data content. Before execution, the queries are checked or validated together to identify any inconsistencies in each query. As each query row includes multiple data fields validating such large number of queries in one-go may be a time-consuming task. Further, such one-time validation of all the queries together may put burden on processing resources of a system that may be carrying out the validation. Any inconsistency identified in the queries are listed and provided to a user creating the queries. Rectifying the inconsistencies in the queries may be cumbersome as the user may have to make multiple corrections in the queries.

Moreover, the data fields selected by the user may include multiple tables and columns of data sources associated with the data content. In case of any error in the data stored in the data sources or in case of mismatch of a data type in the data fields, the queries may not render a desirable output. The existing query generation techniques do not provide any means to check if intended data is present in the data sources. This may cause wastage of time when thousands of queries are run on incorrect data and result in generation of incorrect or invalid visual representations for the portions of the data content.

Approaches for creating and executing queries on data content are described. The present subject matter facilitates in real-time validation of queries while the queries are being created. The present subject matter facilitates in generation of queries that are global in nature and can be re-used across one or more portions of the data content.

In one example, a selection of at least two data fields corresponding to a portion of data content is received. Based on the selection, while creating the query, metadata associated with the at least two data fields may be validated to determine if the query is valid. The metadata may be indicative of a data type of a data field. In an example, the validation is based on a set of conditions. Thus, before retrieving actual data from the associated databases, the query validation is performed in real-time, based on the metadata. Upon determining that the query is valid, data pertaining to the at least two data fields is extracted from a data source associated with the portion. Further, the query is executed on the portion of the data content to generate a visual indicator for representing a subset of the portion of the data content.

In another example, the approaches of the present subject system may recognize different patterns of the queries while the queries are being created by a user. For example, query creation commences with the selection of two or more data fields. As soon as the data fields are selected, a matching score may be computed between the query being created and a plurality of pre-executed queries. If the matching score between the query and a set of pre-executed queries from the plurality of pre-executed queries is above a pre-defined threshold score, a recommendation may be automatically generated. The recommendation may indicate to the user that a similar query had already been generated. The user may be provided an option to either continue with the creation of the query or select a pre-executed query from the set of the pre-executed queries.

In another example, once a set of queries are created, data pertaining to subset of queries is extracted from the data sources associated with the data content. The subset of queries may be randomly select to check if valid queries are being defined by the user. Thereafter, the subset of queries is executed in real-time to ascertain whether the extracted data creates a valid subset of queries. In response to the ascertainment, a notification is generated for the user indicating the user to proceed with a query creation, a query execution, or query modification. Therefore, instead of extracting data for the entire set of queries, the query validation is performed based on the data extracted for a sample of queries. As a result, time and resource consumption is reduced. Accordingly, the present subject matter provides efficient techniques for validation of the queries.

The described approaches thus facilitate in reusing queries across multiple portions of the data content or across different data contents. In addition, by recognizing similar queries, the present subject matter promotes reusing the existing queries, thereby saving time and avoiding redundancy. The real-time validation based on metadata during query creation provides a faster and resource-efficient process. Further, by validating a sample of queries, the approaches of the present subject matter conserves computational resources and time as the present subject matter avoids extracting data for every query. In addition, the present subject matter ensures the integrity of the queries without the overhead of validating every query.

The present subject matter is further described with reference to FIG. 1 to FIG. 9. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 100 for creating and executing a query on data content, according to an example. The data content may relate to information pertaining to an organization, such as sales data, customer data, development data, and so on. In organizations, the data content is generally presented in the form of analytical reports that may have analytical data associated with an organization. Further, the data content may include one or more portions. For example, in context of analytical reports, each analytical report may include one or more chapters that may comprise subset of the analytical data. For example, a commercial company may be the organization and a product sales report may be the analytical report about sales of products sold by the organization. The analytical report may further include multiple chapters describing different aspects or details of the product sales. For example, the analytical report may include chapters depicting the sales data in different regions, chapters depicting sales for different products of the organization, and chapters focusing on sales and revenue of different departments of the organization.

The system 100 may be a device, such as an electronic device, that may be operated by a user for creating and executing the query(s). Examples of the electronic device may include, but are not limited to, a laptop, a desktop, a tablet computer, and a smart phone. The system 100 may be implemented in any computing system, such as a storage array, server, desktop or a laptop computing device, a distributed computing system, or the like. Although not depicted, the system 100 may include other components, such as interfaces to communicate over the network or with external storage or computing devices, display, input/output interfaces, operating systems, applications, data, and other software or hardware components (all of which have not been depicted).

In one example, the system 100 may be a standalone server or may be a remote server on a cloud computing platform. In a preferred example, the system 100 may be a cloud-based system. The system 100 is capable of delivering applications (such as cloud applications) for creating and executing queries on the data content.

The system 100 may include a processor 102 and a machine-readable storage medium 104 which is coupled to, and accessible by, the processor 102. The processor 102 may be implemented as a dedicated processor, a shared processor, or a plurality of individual processors, some of which may be shared. The processor(s) 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

The machine-readable storage medium 104 may be communicatively connected to the processor 102. Among other capabilities, the processor 102 may fetch and execute computer-readable instructions, including instructions 106, stored in the machine-readable storage medium 104. The machine-readable storage medium 104 may include non-transitory computer-readable medium including, for example, volatile memory such as RAM (Random Access Memory), or non-volatile memory such as EPROM (Erasable Programmable Read Only Memory), flash memory, and the like. The instructions 106 may be executed to classify the hardware components of the computing device.

In an example, the processor 102 may fetch and execute instructions 106. In one example, as a result of the execution of the instructions 108, the system 100 may obtain data content comprising one or more portions. A portion may be indicative of a section of the data content. In an example, each of the one or more portions may include at least a set of data from the data content. Once obtained, the instructions 110 may be executed to render a portion from the one or more portions to an authorized user. In an example, the system 100 may be accessed by a user. The processor 102 may request user for credentials, such as a user ID and a password. The processor 102 may check the credentials to check if the user is authorized to create queries on the rendered portion.

For example, the user may be a team lead in a department 'A' of an organization. Upon providing the credentials, the system 100 may check for the role of the user in the organization and render the portion(s) of the data content from the department 'A', that may be role-based, to the user. For example, portions containing data associated with attendance of team members, portions containing data related to work status of the team members, and so on. The authentication step in the system 100 may prevent the user from accessing portions pertaining to other departments and teams. Likewise, if a specific team member accesses the system 100 for creating a query, the system 100 may render only those portions of the data content which relates to the specific team member and may not render portions that may include data associated with different team members.

Upon successful authentication of the user, the instructions 112 may be executed to receive a selection of at least two data fields corresponding to the rendered portion of the data content. In an example, the data fields may include a data source, an object or table from the data source, a column from the table, and so on. In an example, the selection of the data fields may be received from the authorized user. Based on the selection, the processor 102 may create a query. In an implementation, the authorized user may create multiple queries having a row of data fields to generate the visual indicators for the portion of the data content.

Once the selection of the data fields is being performed, the instructions 114 may cause the processor 102 to compute, based on pre-defined rules, a matching score between the query being created and a plurality of pre-executed queries. In an example, the plurality of pre-executed queries may be stored in a query database (not shown). The query database may be remotely located and may be accessible to the system 100. In an implementation, the query database may store queries that may be pre-executed on various portions of same data content or across different data contents.

In one example, the pre-defined rules for computing the matching score may include identifying common data fields selected by the user for creation of the query. In another example, the pre-defined rules for computing the matching score may include identifying an order in which the data fields are selected by the user for creating the query.

Upon computation of the matching score, the instructions 116 may cause the processor 102 to determine that the matching score between the query being created and a set of pre-executed queries from the plurality of pre-executed queries is above a pre-defined threshold score. For example, the threshold score may be pre-defined as 90%. The processor 102 may identify those queries, for which the matching score is above 90%. Such queries may form the set of queries. For instance, if a user is creating a query that involves selecting data fields related to "Quarterly Sales" and "Product Category" from a sales database, the processor 102 may compare this query with pre-executed queries. If there is a pre-executed query with the same or similar data fields and structure, and the matching score is 90% or above, the processor 102 may recommend the user to consider using the pre-existing query. In an example, when the data fields are selected by the user to create the query, the processor 102 may check whether similar queries have been pre-executed or not.

Further, upon determining the set of queries having the matching score above the pre-defined threshold value, the instructions 118 may cause the processor 102 to automatically generate a recommendation indicating the user to continue with the query creation or select a pre-executed query from the set of pre-executed queries. The recommendation may prevent redundancy in query creation and reduce the resource consumption that may be required to process same or similar queries.

The above functionalities performed as a result of the execution of the instructions 108, may be performed by different programmable entities. Such programmable entities may be implemented through any computing systems, which may be implemented either on a single computing device, or multiple computing devices. As will be explained, various examples of the present subject matter are described in the context of a computing system which obtains data fields as a result of user selection and perform validation and query matching. These and other examples are further described with respect to the remaining figures.

FIG. 2 illustrates a communication environment 200 implementing the system 100 for creating and executing a query on data content, according to another example. The communication environment 200 includes the system 100 for creating and executing the query. The system 100 is described in FIG. 1 and may include, but is not limited to, a laptop, a notebook computer, a server computer, and a tablet computer. The system 100 may connect with a plurality of user devices 202-1, 202-2, . . . , 202-N, collectively referred to as user devices 202 and individually referred to as a user device 202, through a network 204. The user devices 202 may include, but are not limited to, a laptop, a notebook computer, a tablet computer, and a desktop.

The network 204 may be a wireless network, a wired network, or a combination thereof. The network 204 can also be an individual network or a collection of many such individual networks, interconnected with each other and functioning as a single large network, e.g., the Internet or an intranet. The network 204 can be implemented as one of the different types of networks, such as intranet, local area network (LAN), wide area network (WAN), the internet, and such. The network 204 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

The system 100 may include the processor(s) 102 as depicted in FIG. 1. Further, in an example, the system 100 may be connected to a database 206 through the network 204. The database 206 may be, for example, a structured query language (SQL) data store or a not only SQL (NoSQL) data store. In an exemplary implementation, the database 206 may be configured as cloud-based database implemented in organization environments. In another exemplary implementation, the database 206 may be a location on a file system directly accessible by the engines. The database 206 may be configured to store data pertaining to the pre-executed queries associated with multiple data contents.

In an example, the database 206 may also store information pertaining to result of the pre-executed queries, such as the result itself or a location in another database where the result of the pre-executed queries is stored. The database 206 may store historical patterns of query construction, including common sequences of data field selections. The database 206 may also store matching scores from previous pattern recognition computations. In addition, the database 206 may store recommendations previously made to users and the users' responses. In another example, the database 206 may contain metadata about the data fields, such as data types for each field (e.g., integer, string, date), constraints and relationships between data fields, descriptions and permissible values or ranges for combining different data fields in a query. In yet another example, the database 206 may also manage user information that may control access to the data content. The user information may include user roles and permissions defining access levels to different portions of data content. The user information may also include authentication credentials (e.g., usernames, hashed passwords) and audit logs recording user access and activities within the system 100.

In one implementation, the network environment 200 may be the organization network, including personal computers, laptops, various servers, such as blade servers, and other computing devices connected over the network 204. The system 100 includes the processor(s) 102. Further, the system 100 includes interface(s) 208 and memory(s) 210. The interface(s) 208 may allow the connection or coupling of the system 100 with one or more other devices, through a wired (e.g., Local Area Network, i.e., LAN) connection or through a wireless connection (e.g., Bluetooth®, Wi-Fi). The interface(s) 208 may also enable intercommunication between different logical as well as hardware components of the system 100.

The memory(s) 210 may be a computer-readable medium, examples of which include volatile memory (e.g., RAM), and/or non-volatile memory (e.g., Erasable Programmable read-only memory, i.e., EPROM, flash memory, etc.). The memory(s) 210 may be an external memory, or internal memory, such as a flash drive, a compact disk drive, an external hard disk drive, or the like. The memory(s) 210 may further include data which either may be utilized or generated during the operation of the system 100.

The system 100 may further include engine(s) 212. The engine(s) 212 may be implemented as a combination of hardware and programming, for example, programmable instructions to implement a variety of functionalities of the engine(s) 212. In examples described herein, such combinations of hardware and programming may be implemented in several different ways. For example, the programming for the engine(s) 212 may be executable instructions. Such instructions may be stored on a non-transitory machine-readable storage medium which may be coupled either directly with the system 100 or indirectly (for example, through networked means). In an example, the engine(s) 212 may include a processing resource, for example, either a single processor or a combination of multiple processors, to execute such instructions. In other examples, the engine(s) 212 may be implemented as electronic circuitry. The engine(s) 212 includes a query creation engine 214, a validation engine 216, a pattern recognition engine 218, a recommendation engine 220, and other engines 222. The other engine(s) 222 may be implemented as a combination of hardware and programming, for example, programmable instructions to implement a variety of functionalities of the engine(s). In examples described herein, such combinations of hardware and programming may be implemented in several different ways. For example, the programming for the engine(s) may be executable instructions. Such instructions may be stored on a non-transitory machine-readable storage medium which may be coupled either directly with the system 100 or indirectly (for example, through networked means). In an example, the engine(s) may include a processing resource, for example, either a single processor or a combination of multiple processors, to execute such instructions. In other examples, the engine(s) may be implemented as electronic circuitry.

The system 100 may further include data 224. The data 224 includes data that is either received, stored, or generated as a result of functions implemented by any of the engine(s) 212 or the system 100. It may be further noted that information stored and available in the data 224 may be utilized by the engine(s) 212 for performing various functions by the system 100. In an example, the data 212 may include query data 226, validation data 228, match data 230, and other data 232. The other data 232 may include data generated by the engine(s) 212. It may be noted that such examples are only indicative. The present approaches may be applicable to other examples without deviating from the scope of the present subject matter.

In operation, the query engine 214 of the system 100 may receive input from a user. The input may be credentials of the user to determine if the user is authorized to access the data content or not. The data content may include any data that may be associated with an organization. For example, the data content may include analytical reports, such as sales reports, progress reports, and so on. Further, the data content may include multiple portions or sections that segregate the data of the data content based on different areas or topics. In organizations, each user may have role-based access to the data content of the organization. Accordingly, to be able to query one or more portions of the data content, the user may be required to have authorization to access the one or more portions of the data content. Based on the credentials received from the user, the query engine 214 may confirm that the user is authorized to query the data content.

Once confirmed, the query engine 214 may render a user interface (shown in FIG. 3) to the authorized user, to create queries for being executed on the data portion. The user interface may include multiple options for the authorized user to create one or more queries. For example, the user interface may include drop-down menus based on which the user may select various data fields for creating the query. The query engine 214 may receive another input from the authorized user. The another input may be a selection of data fields to create one or more queries for being executed on data content. In an implementation, the query engine 214 may receive a selection of at least two data fields corresponding to a portion of the data content, to create a query. The data fields may indicate different variables that may form the query. For example, the data fields may include a data source, an object, a column, etc. The data source may refer to various databases that may be associated with the data content and from which the data is extracted. The object may refer to specific tables within these data sources that are queried. The columns may be understood as individual data points within these objects that are selected for extraction.

The query engine 214 may store the data pertaining to different queries as the query data 226. It is to be noted that the data fields are not specific to a portion of the data content. The data fields may be used with respect to multiple portions and multiple data contents to create the queries.

In one implementation, while the authorized user is creating the queries using the query engine 214, the validation engine 216 may validate metadata associated with the data fields. In an example, the metadata is indicative of a data type of a data field. For example, the data type may indicate whether the data field being selected by the authorized user for creation of the query include textual data, numeric data, alpha-numeric data, and so on. Further, the validation based on metadata is based on a set of conditions. For example, the set of conditions may include determining whether two or more selected data fields are compatible with each other or not. In one example, to create a query, the user selects two data fields, such as "Sales Amount" and "Transaction Date" from a sales database.

The validation engine 216 may, in real-time, retrieve metadata associated with the two data fields. The metadata for "Sales Amount" may indicate that it is a numeric data type (e.g., decimal, float), and the metadata for "Transaction Date" may indicate a date data type. The validation engine 216 may accordingly validate that the data types of the selected fields are compatible with an operation intended in the query. For example, if the query is intended to sum sales amounts over a range of dates, the validation engine 216 may check that "Sales Amount" is a numeric type that can be aggregated, and "Transaction Date" is a date type that can be used to define a range. Accordingly, the validation engine 216 may notify the user that the query being created is valid.

In case, the validation engine 216 detects an issue, such as an attempt to perform arithmetic operations on a text field, the validation engine 216 may generates an error notification. This notification informs the user that the selected data fields are not compatible with the intended query operation.

In an example, the validation engine 216 may indicate the error by highlighting the entire query in a particular color, such as red, to notify that there is a validation error in the query being formed. In another example, when the authorized user has created the entire query, the validation engine 216 may analyze the metadata of various data fields of the query. Based on the analysis, the validation engine 216 may indicate the error by generating a list of validation errors along with the reasons for the validation errors.

In another example, to create a query, the authorized user may select a first data field as a data source for organization 'A', a second data field as a table related to different products of organization 'A', a third data field as a first column in the table related to products, and a fourth data field as a tenth column in the table related to products. The validation engine 216 may perform a validation check based on the above selection of data fields. Based on the validation check, the validation engine 216 may indicate an error by notifying that the table related to products does not include the tenth column. Accordingly, the validation engine 216 may indicate to the authorized user the reason of validation error the query being formed.

Further, upon identifying the validation errors, the validation engine 216 may generate a notification prompting the authorized user to perform one of a deletion of the query and a modification of the query. Accordingly, the present subject matter saves time and resources by validating the metadata of the data fields in real-time. Based on the validation, the user may take necessary actions on the query. The validation engine 216 may store the data pertaining to metadata of the data fields as the validation data 228.

Upon determining that the query is valid, the validation engine 216 may extract data pertaining to the at least two data fields from the data source associated with the portion of the data content. In an example, the data source may be a single database, or multiple databases communicatively coupled to each other. When the data is retrieved from the data source, the query engine 214 may execute the query on the portion of the data content to generate a visual indicator, such as a graph, a heatmap, or a chart. The visual indicator may represent a subset of portion of the data content.

In another implementation, the validation engine 216 may validate the one or more data sources associated with the data content, based on which the queries are created. The authorized user may create a set of queries pertaining to a portion of data content. For example, the set of queries may include 3000 rows of multiple data fields. Once all the queries are created, the validation engine 216 may randomly select a subset of queries from the set of queries created by the user. The validation engine 216 may employ various random sampling techniques to select the subset of queries. In an example, the validation engine 216 may select the subset of queries based on fixed intervals, every $3^{rd}$ row from the 3000 rows of queries. Thereafter, the validation engine 216 may extract data pertaining to the selected subset of queries from one or more data sources associated with the data content. This selective data extraction allows for a sample of the data to be collected without the need to execute a full data extraction job at the time of configuration. For each of the selected subset of queries, the validation engine 216 may extract data pertaining to the data fields from a plurality of data sources associated with the portion.

Upon extraction of the data pertaining to the selected subset of queries, the validation engine 216 may execute the subset of queries. Upon execution, the validation engine 216 may ascertain in real-time whether the extracted data creates a valid subset of queries. For example, upon execution of the subset of the queries, a subset of data may be selectively retrieved from a specified data source. The validation engine 216 may communicate with the data source 206 to retrieve the data. As would be appreciated, the subset of queries includes various attributes that define the source and target connections, the source database (DB), the source table, and the fields within that table from which data is to be extracted.

Once the subset of data is collected, the validation engine 216 may validate the extracted data. Such validation is particularly useful when the full dataset is not available at configuration time and helps to ensure that any operations performed on the data are compatible with the actual data present in the data source 206. The validation engine 216 may therefore dynamically present errors to the user if the data validation fails, which aids in identifying and correcting issues early in the data handling process. Upon ascertainment that the subset of queries creates a valid subset of queries, the validation engine 216 may generate a notification for the user. The notification may indicate to the user to proceed with the query creation, query execution, or query modification.

For example, if the validation engine 216 ascertains that the subset of queries is valid, the validation engine 216 may recommend the user to either continue with creation of more queries or execute the queries that have been created. If the validation engine 216 ascertains that the subset of queries is invalid, the validation engine 216 may recommend the user to modify the queries before running the validation again on the modified queries. The validation engine 216 may store the data pertaining to the subset of queries as the validation data 228.

In yet another implementation, the system 100 may analyze and compare the characteristics of a query being constructed by a user with existing queries. For example, the query engine 214 may obtain data content having one or more portions. Each of the one or more portions may include at least a set of data. In the context of organizations, the data content may refer to an analytical report having analytical data associated with the organization. The portions of the data content may indicate one or more chapters of the analytical report. Each of the one or more chapters may include at least a subset of the analytical data.

Although the present description is explained with reference to analytical reports of organizations, it would be evident that the present subject matter is applicable to other types of data content.

Referring to the implementation, the query engine 214 may render a portion from the one or more portions to the authorized user. In an example, the portion may be rendered to the authorized user corresponding to a role of the authorized user in an organization. For example, a sales team member may have access to only those portions that pertain to the sales data, whereas a chief executive officer (CEO) of the organization may have access to all portions of the data content. As would be understood, the query engine 214 may render a user interface to the authorized user.

Further, the query engine 214 may receive a selection of at least two data fields corresponding to the rendered portion of the data content from the authorized user. The at least two data fields may be received to create a query. The data fields may indicate different parameters associated with the query. In an example, the authorized user may manually enter each of the at least two parameters in the rendered user interface. In another example, the user interface may include drop-down menus for allowing the authorized user to select the at least two data fields.

In an example, the pattern recognition engine 218 may compute a matching score between the query being created and a plurality of pre-executed queries. The computation of the matching score may be based on pre-defined rules. The pre-defined rules are designed to evaluate the degree to which the new query aligns with historical queries that have been previously executed and stored within the system's database. The pre-defined rules may encompass various factors, such as a structural pattern of the query, the data fields selected for creation of the query, the data sources specified, and the types of data objects involved.

In an example, the pre-defined rules include matching a pattern of the query being created with a pattern of each of the plurality of pre-executed queries. The pattern of the query may be indicative of selection of a data source, a data field, and a data object, associated with the query being created. For example, the pattern recognition engine 218 may compute the matching score based on the structural pattern of the query. In this case, the pattern recognition engine 218 may analyze the sequence and types of data fields selected, as well as the relationships between them. For instance, if the query being created has a structure where data field A is followed by B, and then C, and a pre-executed query has the same structural pattern, a higher matching score may be assigned.

In one example, the pattern recognition engine 218 may identify common data fields between the query being created and the pre-executed queries. In the present example, the pre-defined rules may include increasing the matching score when there is a higher number of common data fields. For instance, if the query being created has data fields A, B, and C, and there is a pre-executed query with data fields A, B, C, and D, the matching score would be high due to the three common fields (A, B, and C). The pattern recognition engine 218 may use a simple ratio, such as the number of matching fields divided by the total number of fields in the new query to compute the matching score. The pattern recognition engine 218 may store the matching score as the match data 230.

Upon computation of the matching score, the pattern recognition engine 218 may determine that the matching score between the query being created and a set of pre-executed queries from the plurality of pre-executed queries is above a pre-defined threshold score. For example, the pattern recognition engine 218 may examine various attributes, such as data sources, object names, column names, etc., associated with the query being created and the pre-executed queries. Based on the examination, the pattern recognition engine 218 may identify those pre-executed queries which are at least 75% match of the query being created.

Based on determining the set of pre-executed queries, the recommendation engine 220 may automatically generate a recommendation. The recommendation may indicate the user to continue with the query creation or select a pre-executed query from the set of pre-executed queries. For example, if the query under construction shares a substantial similarity with an existing query, the recommendation engine 220 may suggest to the user that they are potentially recreating an existing query. In such cases, the user may be prompted to use the existing query instead of creating a new one. Recommending the user to reuse the existing or pre-executed query may facilitate streamlining the query construction process and reduce redundancy. In an example, the recommendations may also include suggestions for optimizing the query, being created, based on historical data associated with performance of queries.

Figure 3:
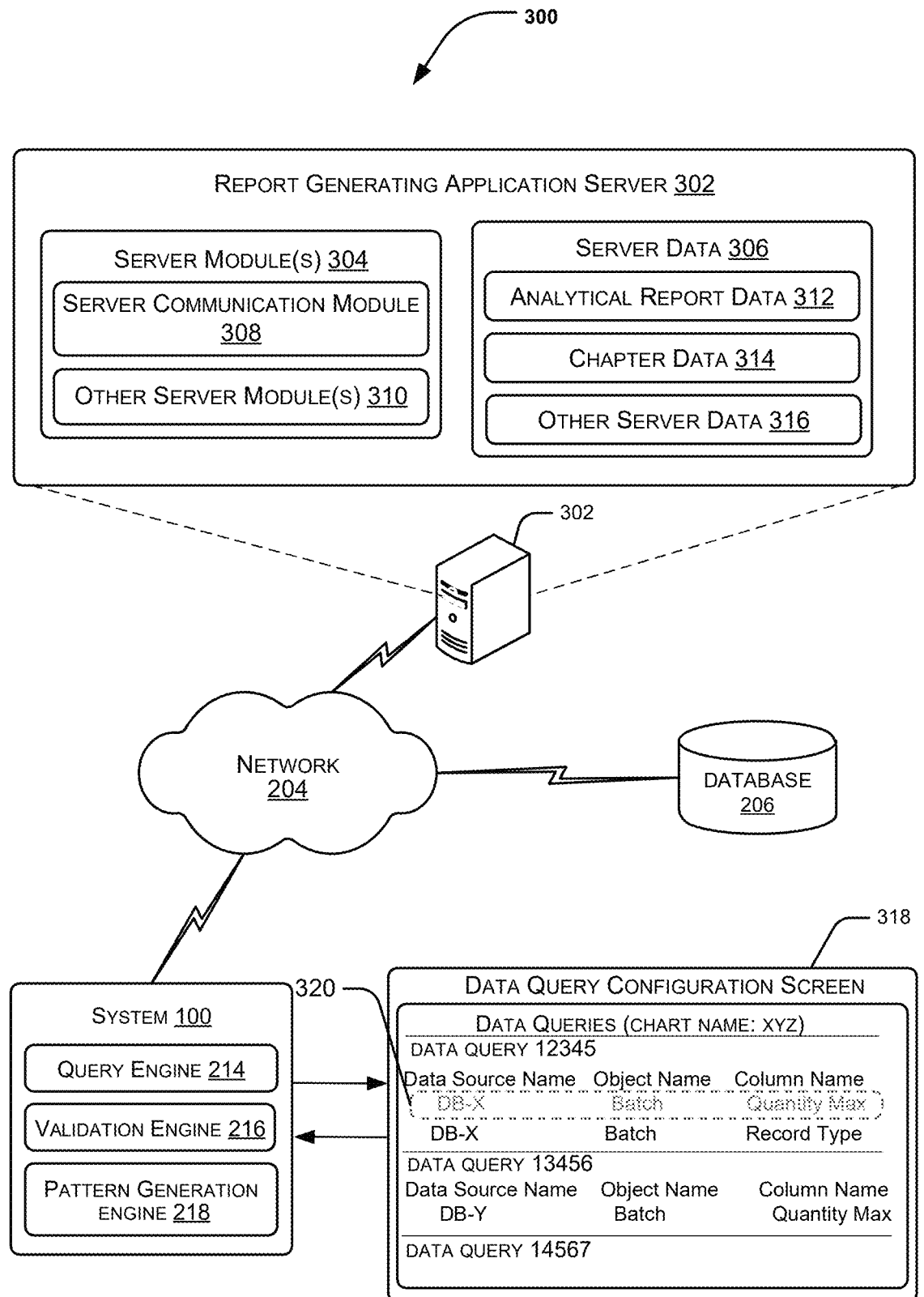
FIG. 3 illustrates a communication environment implementing a system for creating and executing a query on data content, according to another example.

FIG. 3 illustrates a communication environment 300 implementing the system 100 for creating and executing a query on data content, according to another example. In one example, the communication environment 300 may include the system 100 and a report generating application server 302. In an example, the report generating application server 302 may store and maintain data associated with the analytical report, and give authorized users access to the data. In one example, the report generating application server 302 may be hosted virtually, for example, on a cloud-based platform at a site or away from the site. In another example, the report generating application server 302 may be a stand-alone physical system geographically located either on the site or away from the site. Examples of the site may include, but are not limited to, a building of a company, or any other working environments in any industry or enterprise. The building may be a commercial establishment, for example, a commercial complex, an industrial establishment, a data center, and a storage facility. Further, a building may also refer to a combination of two or more structures or compounds.

In an example, the system 100 and the report generating application server 302 may be managed and owned by different entities and may be located at different geographical locations. In another example, the system 100 and the report generating application server 302 may be managed and owned by same entities and may be co-located at a same geographical location. The system 100 and the report generating application server 302 may be communicably coupled with each other over the network 204.

In one example, the report generating application server 302 may include server engine(s) 304 and server data 306. The report generating application server 302 may include components, other than the depicted components, such as display, processor(s), input/output interfaces, operating systems, applications, and other software or hardware components (not shown in the figures).

The server engine(s) 304 may be implemented as a combination of hardware and programming, for example, programmable instructions to implement a variety of functionalities of the server engine(s) 304. In examples described herein, such combinations of hardware and programming may be implemented in several different ways. For example, the programming for the server engine(s) 304 may be executable instructions. Such instructions may be stored on a non-transitory machine-readable storage medium which may be coupled either directly with the report generating application server 302 or indirectly (for example, through networked means). In an example, the server engine(s) 302 may include a processing resource, for example, either a single processor or a combination of multiple processors, to execute such instructions. In the present examples, the non-transitory machine-readable storage medium may store instructions that, when executed by the processing resource, implement server engine(s) 304. In other examples, the server engine(s) 304 may be implemented as electronic circuitry.

In one example, the server engine(s) 304 may include a server communication engine 308 and other server engine(s) 310. The other server engine(s) 310 may further implement functionalities that supplement functions performed by the report generating application server 302 or any of the server engine(s) 304. The server communication engine 308 may be a wireless communication module. Examples of the server communication engine 308 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the server communication engine 308 may also include one or more antennas to enable wireless transmission and reception of data and signals.

The server data 306 includes data that is either received, stored, or generated as a result of functions implemented by any of the server engine(s) 304 or the report generating application server 302. It may be further noted that information stored and available in the server data 308 may be utilized by the server engine(s) 304 for performing various functions by the report generating application server 302. The server data 308 may include analytical report data 312, chapter data 314, and other server data 316. The analytical report data 312 may include information pertaining to different analytical reports and the chapters of each analytical report. For example, the analytical report data 312 may include organization attributes corresponding to various organizations that access various report generating applications hosted by the report generating application server 302. Further, the analytical report data 312 may include user attributes corresponding to various users associated with the organizations.

Examples of the organization attributes may include, but are not limited to, an ID associated with a particular organization and a name of the particular organization. Examples of the user attributes may include, but are not limited to, an ID associated with a particular user, a name of the particular user, a name of the particular organization with which the particular user is associated, and a department of the particular organization in which the particular user works. The chapter data 314 may include parameters associated with the chapters of the analytical report. Examples of the parameters associated with the chapters may include, but are not limited to, an ID of the analytical report in which a particular chapter is included, an ID associated with the particular chapter, a title associated with the particular chapter, a type of the particular chapter, and a description of the particular chapter. The other server data 316 includes data that is either received, stored, or generated as a result of functions implemented by any of the server engine(s) 304 or the report generating application server 302.

In one example, the system 100 may include the query engine 214, the validation engine 216, and the pattern recognition engine 218, as explained with reference to FIG. 2. The system 100 may include components other than the depicted components, such as display, input/output interfaces, operating systems, applications, and other software or hardware components (not shown in the figures).

As previously mentioned, one or more users intending to include one or more visual indicators in an analytic report may use the system 100 to automatically populate the visual indicators in different chapters of the analytic report. In one example, a first user, such as an administrator of an organization may initially access a business intelligence (BI) tool associated with the system 100 and the organization to define various queries for being used by one or more second users of the organization. In an example, the first user and the second user may be associated with same organization. In an example, the first user may be same as the second user. In another example, the first user may be different than the second user.

The queries defined by the first user are global data queries that are not restricted to any chapter. In other words, the global data queries may be understood as query templates that may be used across any chapter and any analytical report. Thus, the data queries may be used amongst different chapters of same or different analytical reports. Subsequently other users may use the system 100 to automatically populate the queries into different chapters of one or more analytic reports.

In operation, to create the visual indicators, a second user may access the system 100 to log-in into the BI tool installed in the system 100. The system 100 may thus receive a BI tool login request from the second user for logging into the BI tool installed in the system 100. The BI tool login request may include BI tool login credentials, such as a user ID and a password, entered by the second user. The system 100 may query a BI tool server (not shown) about the BI tool login credentials to check if the second user is authorized to access the BI tool. Upon successful authentication of the second user, the system 100 may allow the second user to use the BI tool for creating queries on one or more chapters of the analytical report, using the global data queries.

In an example, upon successful authentication, the query engine 214 may provide an analytical report to the second user. In an example, the analytical report may be obtained from the report generating application server 302. The analytical report may have analytical data associated with the organization with which the second user is associated. In an example, the analytical report may comprise one or more chapters with each of the one or more chapters comprising at least a subset of the analytical data. The analytical data may be raw data that is desired to be graphically represented through one of more visual indicators in the analytical report. The one or more chapters of the analytical report are rendered based on a role of the second user in the organization. In an example, the analytical report and the chapters may be pre-created by a user using the report generating application.

Once the analytical report is obtained, the query engine 214 may render a user interface screen, such as a data query configuration screen 318 to the second user. The second user may employ multiple drop-down menus or other templates of the data query configuration screen 318 to select at least two data fields. As explained previously, the data fields may include a data source, an object, a column, etc. The second user may create multiple rows of queries for being executed on the one or more chapters of the analytical report.

The validation engine 216 may validate each row of queries in real-time to notify the second user in case of any error in the query being created. In an example, the validation engine 216 may perform a metadata-based validation. In such validation, data type associated with each data field is checked to ensure whether formation of such query would fetch meaningful results or not. If the validation engine 216 determines that the data type of the data fields of the query are incompatible with each other, the validation engine 216 may generate an error message. In an example, the validation engine 216 may highlight the entire query row, as depicted by 320, in a specific color to bring to the attention of the second user.

In another example, the validation engine 216 may perform a data-based validation. In such validation, the validation engine 216 may select a few queries from the multiple queries created by the user. For the selected queries, the validation engine 216 may extract data pertaining to each data field from the data source. If after extraction of the data, the set of queries when executed provides invalid result, the validation engine 216 may notify the second user that there may be error in the data stored in the database 206.

Based on the notifications or error messages generated by the validation engine 216, the second user may opt to either modify the query/queries being created or may delete the query/queries.

In addition, the pattern recognition engine 218 may compute a matching score between the query being created and the pre-executed queries. Based on the matching score, the pattern recognition engine 218 may identify those pre-executed queries that have substantial similarity with the query being created. For example, if the similarity between the query being created and the pre-executed queries is about 70% or more, the pattern recognition engine 218 may notify the second user about such queries.

Although, for brevity, only a single system 100, has been illustrated for accessing both the report generating application, it would be understood by a person skilled in the art that the report generating application may also be accessed separately through separate systems by same or different users.

Figure 4A:
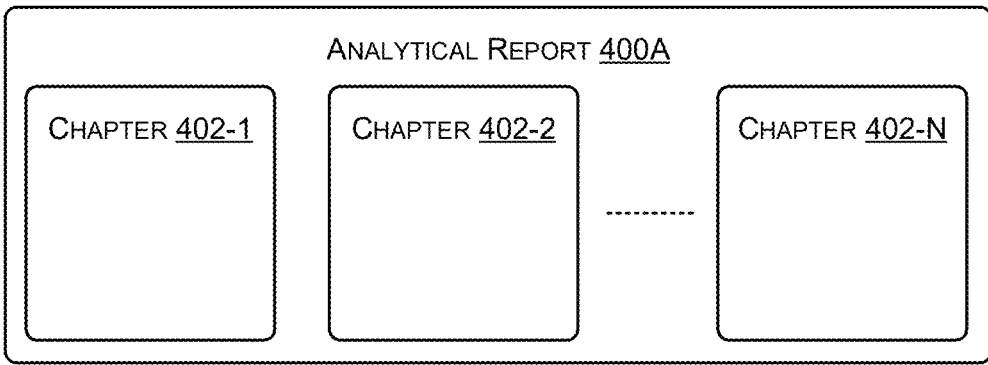
FIG. 4A, FIG. 4B, and FIG. 4C illustrate different stages of creating and executing a query on data content using a system, according to an example.
Figure 4B:
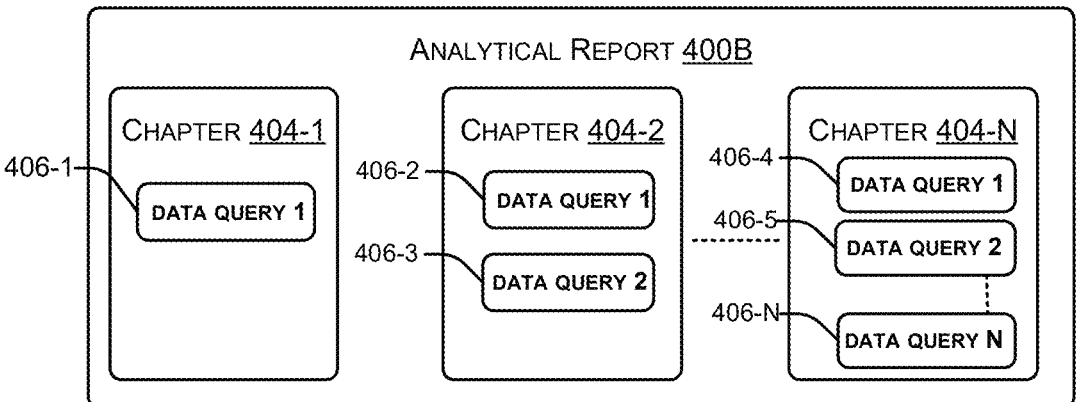
Figure 4C:
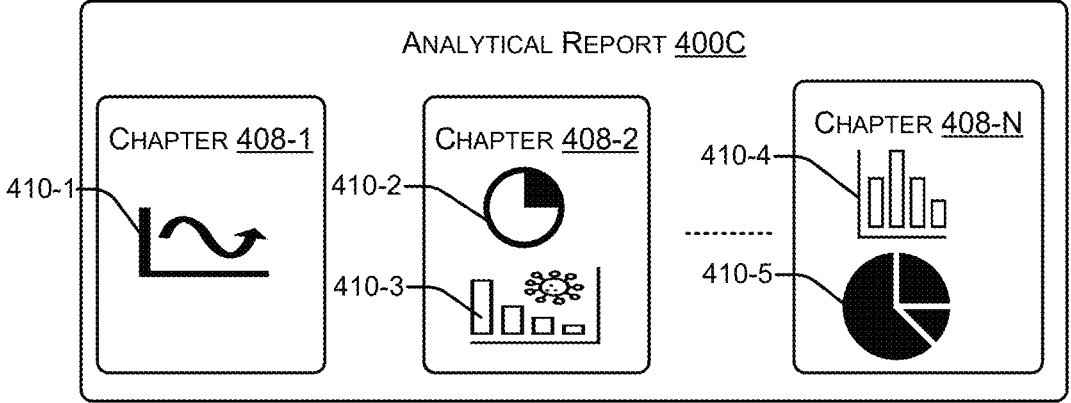

FIG. 4A, 4B, and FIG. 4C illustrate different stages of creating and executing a query on data content using a system, such as the system 100, according to an example. FIG. 4A illustrates example analytical report 400A, at an initial stage, i.e., before creation of queries. The analytical report 400A may include one or more chapters 402-1, 402-2, . . . 402-N. Here, N may be greater than or equal to 1. The one or more chapters 402-1, 402-2, . . . 402-N may be collectively referred to as chapters 402 and individually as chapter 402. The initial stage is a stage where queries are not formed for generating the visual indicators in the chapters 402 of the analytical report 400A. In an example, the system 100 may obtain an analytical report having analytical data associated with an organization. The organization may be a particular organization for which the analytical report is to be finalized. In an example, the analytical report 400A and the chapters 402 may be created in advance by a user using the report generating application.

FIG. 4B illustrates an intermediate analytical report 400B at a query creation stage, according to an example. The intermediate analytical report 400B may include one or more chapters 404-1, 404-2, . . . 404-N. Here, N may be greater than or equal to 1. The one or more chapters 404-1, 404-2, . . . 404-N may be collectively referred to as chapters 404 and individually as a chapter 404. The query creation stage is a stage where queries 406-1, 406-2, . . . , 406-N, are defined by the users, such as the second users, based on the query templates created by an administrator. The queries 406-1, 406-2, . . . , 406-N, are collectively referred to as queries 406 and individually as query 406. As illustrated, the query 406-1 have been constructed for the chapter 404-1 by an authorized user thereof. Likewise, queries 406-2 and 406-3 have been formed by an authorized user of the chapter 404-2. In addition, the authorized user of the chapter 404-N may create asset of queries, including the queries 406-4, 406-5, . . . 406-N. In an example, the authorized user may be same for each of the chapters 404-1, 404-2, . . . , 404-N. In another example, the authorized user may be different for each of the chapters 404-1, 404-2, . . . , 404-N. The queries undergo validation checks in real-time and thereafter are executed on the chapters of the analytical report 400B. As described earlier, the query engine 214 may allow the users to create multiple queries that may be validated in real-time, before execution. Once validated, the pattern recognition engine 218 may indicate if any pre-executed queries match the pattern of the query being created in real-time.

FIG. 4C illustrates a final analytical report 400C at a subsequent stage, according to an example. The final analytical report 400C may include one or more chapters 408-1, 408-2, . . . 408-N. Here, N may be greater than or equal to 1. The one or more chapters 408-1, 408-2, . . . 408-N may be collectively referred to as chapters 408 and individually as a chapter 408. The subsequent stage is a stage where visual indicators 410-1, 410-2, 410-3, 410-4, 410-5 are incorporated in the chapters 408 based on the queries defined by the users. The visual indicators may include a chart, a graph, etc., to graphically represent the analytic data contained within each chapter. As illustrated, the visual indicators 410-1 have been incorporated in the chapter 408-1 of the final analytical report 400C. Further, the visual indicators 410-2 and 410-3 have been incorporated in the chapter 408-2 of the final analytical report 400C. As illustrated, the visual indicators 410-4 and 410-5 have been incorporated in the chapter 408-N of the final analytical report 400C. Accordingly, the authorized users of the analytical report may generate visual indicators with ease without any hindrance with respect to errors in the queries or without having to recreate same queries.

FIG. 5, FIG. 6, FIG. 7, and FIG. 8 illustrate example methods 500, 600, 700, and 800, respectively, for creating and executing queries on data content, according to different examples. The order in which the methods are described is not intended to be construed as a limitation, and any number of the described method blocks may be combined in any order to implement the methods, or an alternative method. Further, the methods 500, 600, 700, and 800 may be implemented by processing resource or computing device(s) through any suitable hardware, non-transitory machine-readable instructions, or combination thereof.

It may also be understood that methods 500, 600, 700, and 800 may be performed by programmed computing devices, such as the system 100, as depicted in FIG. 1 and FIG. 2. Furthermore, the methods 500, 600, 700, and 800 may be executed based on instructions stored in a non-transitory computer-readable medium, as will be readily understood. The non-transitory computer-readable medium may include, for example, digital memories, magnetic storage media, such as one or more magnetic disks and magnetic tapes, hard drives, or optically readable digital data storage media. While the methods 500, 600, 700, and 800 are described below with reference to the system 100 as described above; other suitable systems for the execution of these methods may also be utilized. Additionally, implementation of these methods is not limited to such examples.

FIG. 5 illustrates the method 500 for creating and executing a query on data content, according to an example. At block 502, a selection of at least two data fields corresponding to a portion of data content may be received, to create a query. The data fields may indicate different variables that may form the query. For example, the data fields may include a data source, an object, a column, etc. The data source may refer to various databases that may be associated with the data content and from which the data is extracted. The object may refer to specific tables within these data sources that are queried. The columns may be understood as individual data points within these objects that are selected for extraction. In an example, the selection may be received from an authorized user of an organization to which the data content pertains. In an example, the query engine 214 may receive the selection of data fields from the authorized user, as explained with reference to FIG. 2 and FIG. 3.

At block 504, metadata associated with the at least two data fields are validated. In an example, the metadata is indicative of a data type of the data field. For example, the metadata may indicate whether the data fields include numeric data, string data, character data, and so on. In an example, while the query is being created, the validation engine 216 may perform validation of the query based on a set of conditions, as explained with reference to FIG. 2 and FIG. 3. In an example, the set of conditions may determine whether the two or more selected data fields are compatible with each other or not.

At block 506, upon determining that the query is valid, data pertaining to the at least two data fields may be extracted from a data source associated with the portions of data content. In an example, the data source may be the database 206. In an example, the data pertaining to the at least two data fields may be extracted by the validation engine 216 in a similar manner as explained with reference to FIG. 2 and FIG. 3.

At block 508, the query is executed on the portion of data content to generate a visual indicator for representing a subset of portion of data content. In an example, the query may be executed by the query engine 214 in a similar manner as explained with reference to FIG. 2 and FIG. 3. For example, the query may be executed on a chapter of the analytical report to generate graphs or charts.

Figure 6:
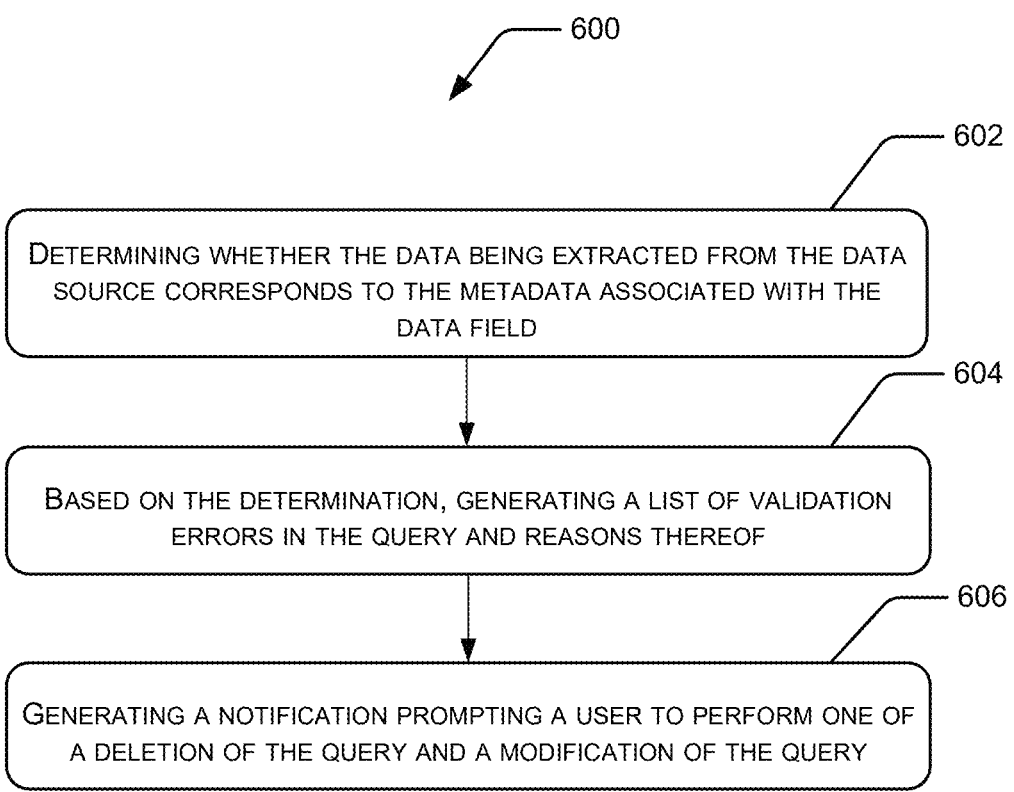
FIG. 6 illustrates a method for real-time validation of a query based on metadata associated with the data fields, according to an example.

FIG. 6 illustrates the method 600 for real-time validation of a query based on metadata associated with the data fields, according to an example.

At block 602, when the validation is initiated, it is determined whether the data being extracted from the data source corresponds to the metadata associated with the data field. For example, if the data type of a first data field is textual, the validation engine 216 may determine whether the data extracted from the data source corresponds to textual data or not.

At block 604, based on the determination, a list comprising validation errors in the query and the reasons thereof, may be generated. In an example, the validation engine 216 may generate a list indicating possible validation errors in the query and the causes for such validation errors. For instance, if two data fields are incompatible with each other, i.e., may not be combined together in a query, the validation engine 214 may mention the reason for such incompatibility in the list.

At block 606, a notification may be generated prompting the user to perform one of a deletion of the query and a modification of the query. For example, the validation engine 216 may generate a notification for the authorized user when any error is identified during validation of the query. The notification may indicate the authorized user to either delete the query in view of the validation error or may suggest modifications to be made in the query.

FIG. 7 illustrates a method 700 for real-time validation of a query based on data retrieved from a plurality of data sources, according to another example.

At block 702, a selection of at least two data fields may be received. The at least two data fields may correspond to a portion of data content. The at least two data fields may be received to create a set of queries. For example, the query engine 214 may receive the selection of data fields from the authorized user. The portion of the data content may be understood as one or more chapters of the analytical report.

At block 704, data pertaining to the at least two data fields from the plurality of data sources associated with the portion may be extracted. The data corresponds to a subset of queries from the set of queries. In an example, the subset of queries may be randomly selected. In an implementation, the validation engine 216 may extract data pertaining to the randomly selected queries. For example, the set of queries may include 1000 rows of multiple data fields. Once all the queries are created, the validation engine 216 may randomly select a subset of queries from the set of queries created by the user. The validation engine 216 may employ various random sampling techniques to select the subset of queries. In an example, the validation engine 216 may select the subset of queries based on fixed intervals, every $n^{th}$ row from the 1000 rows of queries. In another example, the validation engine 216 may select the subset of queries based on selection of consecutive rows, say top 50 rows. Thereafter, the validation engine 216 may extract data pertaining to the selected subset of queries from one or more data sources associated with the data content.

At block 706, the method 700 includes executing the subset of queries to ascertain whether extracted data creates a valid subset of queries. In an example, the subset of queries may be executed in real-time by the validation engine 216. Once the subset of data is collected, the validation engine 216 may validate the extracted data by determining if the executed subset of queries results in meaningful results or provide invalid results.

At block 708, the method 700 includes, based on the ascertainment, generating a notification for the user. The notification may indicate the user to proceed with one of a query creation, a query execution, and a query modification. In an example, upon ascertainment, that the subset of queries fetched relevant and valid results, the validation engine 216 may prompt the user to either continue to create more queries by adding more rows of data fields in the set of queries or proceed to execute the entire set of queries to generate visual indicators. In another example, upon ascertainment, that the subset of queries fetched invalid results, the validation engine 216 may prompt the user to modify the queries to obtain valid results.

FIG. 8 illustrates a method 800 for pattern matching while creation of queries on portion of data content, according to another example. At block 802, the method 800 includes obtaining data content comprising one or more portions. In an example, each of the one or more portions may include at least a set of data. In the context of organizational reports, the data content may represent an analytical report, such as a sales report, audit reports, and so on. Further, one or more portions of the data content may represent various chapters or sections of the analytical report. In an example, the query engine 214 may obtain data content having one or more portions.

At block 804, the method 800 includes rendering a portion from the one or more portions to an authorized user. In an example, the query engine 214 may render a portion from the one or more portions to the authorized user. In an example, the portion may be rendered to the authorized user corresponding to a role of the authorized user in the organization.

At block 806, the method 800 includes receiving a selection of at least two data fields corresponding to the rendered portion of the data content, from the authorized user to create a query. The data fields may indicate different parameters associated with the query. In an example, the query engine 214 may receive the selection of the at least two data fields from the authorized user, either manually or through drop-down menus.

At block 808, the method 800 includes computing a matching score between the query being created and a plurality of pre-executed queries. The computation of the matching score may be based on pre-defined rules. The plurality of pre-executed queries may be stored in a database, such as the database 206. In an example, the pattern recognition engine 218 may compute the matching score. The pre-defined rules may encompass various factors, such as a structural pattern of the query, the data fields selected for creation of the query, the data sources specified, and the types of data objects involved.

At block 810, the method 800 includes determining that the matching score between the query being created and a set of pre-executed queries from the plurality of pre-executed queries is above a pre-defined threshold score. For example, the pattern recognition engine 218 may examine various attributes, such as data sources, object names, column names, etc., associated with the query being created and the pre-executed queries. Based on the examination, the pattern recognition engine 218 may identify those pre-executed queries which are at least 75% match of the query being created.

At block 812, the method 800 includes upon determining the set of pre-executed queries, automatically generating a recommendation indicating the user to continue with the query creation or selection of a pre-executed query from the set of pre-executed queries. In an example, the recommendation engine 220 may automatically generate the recommendations for the authorized user. In an example, the recommendations may also include suggestions for optimizing the query, being created, based on historical data associated with performance of queries. Recommending the user to reuse the existing or pre-executed query may save time spent on query construction and reduce redundancy.

FIG. 9 illustrates a computing environment 900 implementing a non-transitory computer-readable medium for creating and executing a query, according to an example. In an example, the computing environment 900 includes processor(s) 902 communicatively coupled to a non-transitory computer readable medium 904 through a communication link 906. In an example, the processor(s) 902 may have one or more processing resources for fetching and executing computer-readable instructions from the non-transitory computer readable medium 904. The processor(s) 902 and the non-transitory computer readable medium 904 may be implemented, for example, in the system 100 (as has been described in conjunction with the preceding figures).

The non-transitory computer readable medium 904 may be, for example, an internal memory device or an external memory device. In an example implementation, the communication link 906 may be a network communication link. The processor(s) 902 may access the non-transitory computer readable medium 904 through a network 908. The network 908 may be a single network or a combination of multiple networks and may use a variety of communication protocols. The processor(s) 902 and the non-transitory computer readable medium 904 may also be communicatively coupled to a data source 910 over the network 908. The data source 910 may include, for example, a database.

In an example implementation, the non-transitory computer readable medium 904 includes a set of computer readable instructions (hereinafter may also be referred as instructions) 912 which may be accessed by the processor(s) 902 through the communication link 906. Referring to FIG. 9, in an example, the non-transitory computer readable medium 904 includes instructions 912 that may cause the processor(s) 902 to receive input from a user to create a set of queries pertaining to a portion of data content. The input is indicative of a selection of at least two data fields corresponding to the portion of the data content. In an example, the data content may relate to information pertaining to an organization, such as sales data, customer data, development data, and so on. In an example, the data fields may include a data source, an object or table from the data source, a column from the table, and so on.

Upon receiving the selection of at least two data fields, the instructions 912 may cause the processor(s) 902 to extract data pertaining to the at least two data fields, from a plurality of data sources associated with the portion of the data content. The data being extracted may correspond to a subset of queries randomly selected from the set of queries. For example, when a user selects multiple data fields to create a set of queries (for instance 500 queries), the actual data pertaining to the data field is not captured in the queries. Only when each query is executed, the actual data is accessed by the system 100. To prevent any discrepancy or error in the data stored in one or more data sources and the data defined in the data fields, data pertaining to a sample of queries is extracted.

Upon extracting the data for the subset of randomly selected queries, the instructions 912 may cause the processor(s) 902 to execute the subset of queries to ascertain, in real-time, whether the extracted data creates a valid subset of queries. If the subset of queries provides desired results based on the data fields selected, the ascertainment may be made that the subset of queries is valid. On the other hand, if the subset of queries provides incorrect results, the ascertainment may be made that the subset of queries is invalid.

The instructions 912 may further cause the processor(s) 902 to generate a notification for the user in response to the ascertainment. The notification may indicate the user to proceed with one of a query creation, a query execution, and a query modification. For example, if it is ascertained that the subset of queries is invalid, the user may be prompted to modify the set of queries. On the other hand, if it is ascertained that the subset of queries is invalid, the user may be prompted to define another query or to proceed with query execution. In response to the query execution, the instructions may cause the processor(s) 902 to execute the set of queries on the portion of the data content to generate a visual indicator for representing the data content. In an example, generating the visual indicator includes providing graphical representation of the portion of the data content.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A method comprising:
   receiving a selection of at least two data fields corresponding to a portion of data content, to create a query;
   performing in real-time, a pattern recognition between the query and a plurality of pre-executed queries, the plurality of pre-executed queries stored in a database;
   while creating the query, validating metadata associated with the at least two data fields to determine if the query is valid, the validation is based on a set of conditions, wherein the metadata is indicative of a data type of a data field, and wherein the query is validated in real-time before execution;
   upon determining that the query is valid, extracting data pertaining to the at least two data fields from a data source associated with the portion; and
   executing the query on the portion of data content to generate a visual indicator for representing a subset of the portion of data content.

2. The method as claimed in claim 1, wherein the set of conditions comprises determining whether two or more selected data fields are compatible with each other.

3. The method as claimed in claim 1, wherein validating the metadata comprises generating a list of validation errors in the query and reasons thereof.

4. The method as claimed in claim 1, wherein the validating comprises generating a notification prompting a user to perform one of a deletion of the query and a modification of the query.

5. The method as claimed in claim 1, wherein extracting the data comprises validating whether the data being extracted from the data source corresponds to the metadata associated with each of the at least two data fields.

6. The method as claimed in claim 1, wherein generating the visual indicator comprises providing graphical representation of the portion of the data content.

7. The method as claimed in claim 1, wherein the visual indicator comprises at least one of a chart, a graph, a table, and a heatmap.

8. A system comprising:

a processor;

a machine-readable storage medium comprising instructions executable by the processor to:

obtain data content comprising one or more portions, wherein each of the one or more portions comprises at least a set of data;

render a portion from the one or more portions to an authorized user;

receive a selection of at least two data fields corresponding to the rendered portion of the data content from the authorized user, to create a query;

performing in real-time, a pattern recognition between the query and a plurality of pre-executed queries, the plurality of pre-executed queries stored in a database;

while creating the query, validating metadata associated with the at least two data fields to determine if the query is valid, the validation is based on a set of conditions, and wherein the query is validated in real-time before execution;

compute, based on pre-defined rules, a matching score between the query being created and the plurality of pre-executed queries;

determine that the matching score between the query being created and a set of pre-executed queries from the plurality of pre-executed queries is above a pre-defined threshold score; and upon determining, automatically generate a recommendation indicating to the authorized user to continue with the query creation or select a pre-executed query from the set of pre-executed queries.

9. The system as claimed in claim 8, wherein the portion is rendered to the authorized user corresponding to a role of the authorized user in an organization.

10. The system as claimed in claim 8, wherein the pre-defined rule comprises matching a pattern of the query with a pattern of each of the plurality of pre-executed queries.

11. The system as claimed in claim 10, wherein the pattern is indicative of selection of a data source, a data field, a data object, associated with the query.

12. The system as claimed in claim 8, wherein the pre-defined rules for computing the matching score comprises identifying an order in which the data fields are selected by the authorized user for creating the query.

13. The system as claimed in claim 8, wherein the processor is to generate a visual indicator for representing the data content upon receiving a response to the recommendation from the authorized user.

14. The system as claimed in claim 8, wherein the data content pertains to an analytical report having analytical data associated with an organization, the analytical report comprising one or more chapters, wherein each of the one or more chapters comprises at least a subset of the analytical data.

15. The system as claimed in claim 8, wherein the recommendation comprises suggestions for optimizing the query based on historical data associated with query performance.

16. A non-transitory computer-readable medium having instructions stored thereon, the instructions, when executed by a processor, cause the processor to perform operations comprising:

receive input from a user to create a set of queries pertaining to a portion of data content, wherein the input is indicative of a selection of at least two data fields corresponding to the portion;

performing in real-time, a pattern recognition between the set of queries and a plurality of pre-executed queries, the plurality of pre-executed queries stored in a database;

while creating the set of queries, validating metadata associated with the at least two data fields to determine if the set of queries are valid, the validation is based on a set of conditions, and wherein the set of queries are validated in real-time before execution;

extract data pertaining to the at least two data fields, from a plurality of data sources associated with the portion, the data corresponds to a subset of queries from the set of queries, wherein the subset of queries is randomly selected;

execute the subset of queries to ascertain, in real-time, whether the extracted data creates a valid subset of queries; and in response to the ascertainment, generate a notification for the user indicating to proceed with one of a query creation, a query execution, and a query modification.

17. The non-transitory computer-readable medium as claimed in claim 16, wherein the instructions, when executed by the processor, cause the processor to, in response to the query execution, execute the query on the portion of data content to generate a visual indicator for representing the data content.

18. The non-transitory computer-readable medium as claimed in claim 17, wherein the generating the visual indicator comprises providing graphical representation of the portion of the data content.

19. The non-transitory computer-readable medium as claimed in claim 16, wherein the data content pertains to an analytical report having analytical data associated with an organization, the analytical report comprising one or more chapters, wherein each of the one or more chapters comprises at least a subset of the analytical data.

\* \* \* \* \*